United States Patent [19]

Tokuno

[11] 4,133,708

[45] Jan. 9, 1979

[54] METHOD FOR PRODUCING A FISHING-ROD

[76] Inventor: Tomotoshi Tokuno, 15-20, Shingashi 1-chome, Itabashi-ku, Tokyo, Japan

[21] Appl. No.: 725,124

[22] Filed: Sep. 20, 1976

[30] Foreign Application Priority Data

Sep. 25, 1975 [JP] Japan .................... 50/114841

[51] Int. Cl.² .............. B32B 27/04; A01K 87/00; B32B 05/12
[52] U.S. Cl. ................ 156/179; 43/18 GF; 156/178; 156/189; 156/192
[58] Field of Search ............ 156/148, 166, 189, 190, 156/192, 178, 179, 184; 43/18 GF, 18 R; 273/DIG. 23

[56] References Cited

U.S. PATENT DOCUMENTS

| | | | |
|---|---|---|---|
| 2,594,838 | 4/1952 | Alexander et al. | 43/18 GF |
| 2,726,185 | 12/1955 | Howald | 156/184 X |
| 3,166,319 | 1/1965 | Brilhart | 156/192 |
| 3,416,255 | 12/1968 | Johnson | 43/18 GF |
| 3,457,962 | 7/1969 | Shobert | 156/148 |
| 3,581,425 | 6/1971 | Orr | 43/18 GF |

FOREIGN PATENT DOCUMENTS 1261541  1/1972  United Kingdom ............ 273/DIG. 23

*Primary Examiner*—William A. Powell
*Assistant Examiner*—Thomas Bokan
*Attorney, Agent, or Firm*—Wenderoth, Lind & Ponack

[57] ABSTRACT

A method for producing a fishing-rod in which at least one piece of trapezoidal glass fiber fabric having warp and weft yarns intersecting each other is provided. The fabric is impregnated with thermosetting plastic and is wound about a tapered mandrel with the narrower end portion of the fabric being directed toward the reduced diameter end portion of the mandrel. At the same time as the winding, a bundle of long carbon fibers is interposed between each adjacent turn of the glass fiber fabric with the carbon fibers extending in the longitudinal direction of the mandrel. The thus obtained assembly is heated to set the thermosetting plastic, and then the mandrel is removed from the assembly.

7 Claims, 10 Drawing Figures

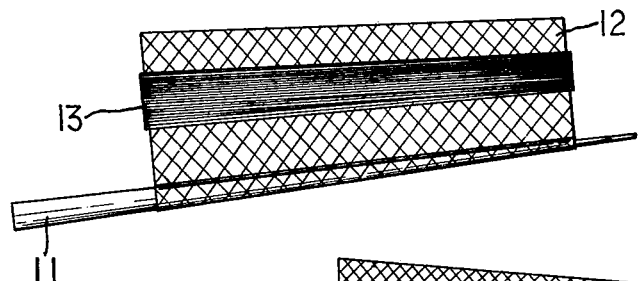
FIG 7
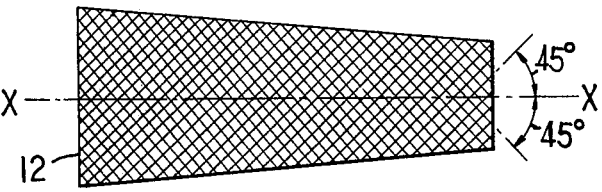
FIG 8
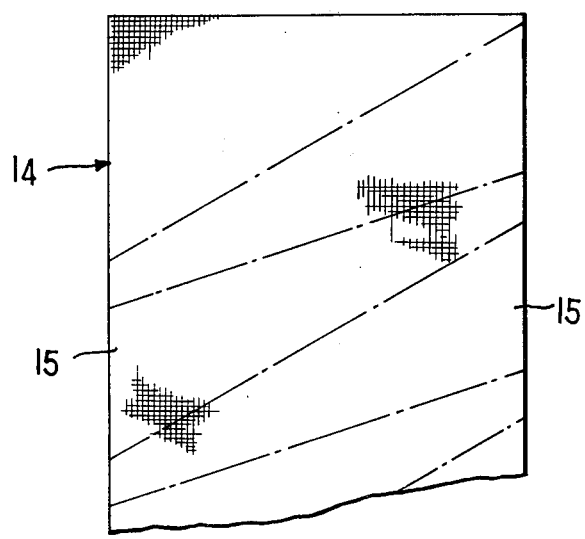
FIG 10
FIG 9
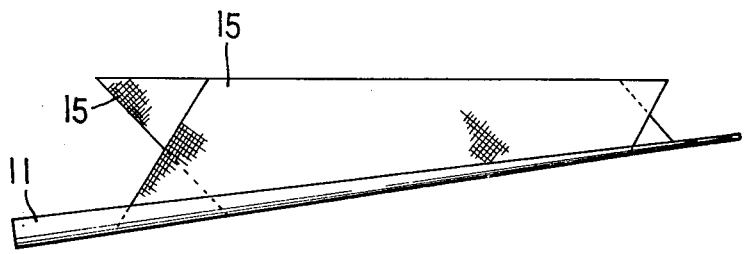

METHOD FOR PRODUCING A FISHING-ROD

BACKGROUND OF THE INVENTION

This invention relates to plastic reinforced fiber products and more particularly, to plastic reinforced glass fiber fishing-rods.

Glass fiber fishing-rods have been generally referred to as glass fishing rods and are well known in the art.

There have been proposed and practically employed a number of methods for producing plastic reinforced glass fiber fishing-rods. In one of the conventional methods as shown in FIGS. 1 and 2, a piece of trapezoidal glass fiber fabric 2 which has been preliminarily impregnated with liquid thermosetting plastic is wound about a tapered mandrel 1 in an annular form with the narrower width end of the fabric directing to the reduced diameter end of the mandrel, and then a cellophane tape 3 is wound about the glass fiber fabric 2 in a spiral form. The thermosetting plastic in the thus-formed assembly is set by heating the assembly at a temperature within the temperature range of 140°–180° C. for about 0.5–2 hours and thereafter, the mandrel 1 and cellophane tape 3 are removed from the stiffened glass fiber fabric 2 to thereby obtain a desired plastic reinforced glass fiber fishing-rod. Although the thus-obtained glass fiber fishing rod is tough, since the specific gravity of the glass fibers of the glass fiber fabric is 2.7, the fishing-rod has the disadvantages that the fishing-rod is relatively heavy and that the fishing-rod is too flexible for its intended use.

Carbon fiber generally has a strength greater than glass fiber and the coefficient of elasticity of the former is quite a bit smaller than that of the latter and therefore, when a fishing-rod is formed of carbon fibers, such a fishing-rod has a stiffness suitable for its intended use. Furthermore, since carbon fiber has the specific gravity of 1.8 which is substantially lighter than that of glass fiber, the fishing rod formed of carbon fibers is quite light in weight. However, since carbon fiber is a very expensive material, if a fishing-rod is produced from a carbon fabric which comprises 100% carbon fibers, such a fishing-rod is economically impractical. Furthermore, since carbon fiber is low in elasticity and rather stiff, the tip end of a fishing-rod formed of a carbon fabric comprising 100% carbon fibers has to have imparted thereto an additional elasticity by a specific means depending upon the purposes for use. Therefore, it has been conventionally considered that plastic reinforced fishing-rods are required to be produced by the use of glass and carbon fibers in combination.

As one of the conventional methods of producing a fishing-rod by the combined use of glass and carbon fibers, as shown in FIG. 3, for example, a piece of trapezoidal glass fiber fabric 2 similar to the glass fiber fabric 2 shown in FIGS. 1 and 2 is wound about a tapered mandrel 1 similar to the mandrel 1 shown in FIGS. 1 and 2 in the same manner as described in connection with FIGS. 1 and 2. However, in the example of FIG. 3, a bundle of carbon fibers 4 having substantially the same length as the glass fiber fabric 2 and impregnated with the same thermosetting plastic as that employed in the glass fiber fabric 2 is interposed between adjacent turns of the glass fiber fabric 2 covering a distance in the transverse direction of the glass fiber with carbon fibers extending in the longitudinal direction of the mandrel 1 while the glass fiber fabric is being wound about the mandrel to provide an alternate spiral cross-section or alternatively, each bundle of such carbon fibers 4 is interposed between each adjacent turn of the glass fiber fabric covering a shorter distance in the transverse direction of the glass fiber fabric 2 in a similar manner in an offset relation to other bundles of long carbon fibers interposed between other successive turns of the glass fiber fabric. In such a case, the long carbon fibers are not woven, but merely orientated flat in the same longitudinal direction as they are. Although the fishing-rod produced by the method shown in FIG. 3 has great strength in the longitudinal direction because the long carbon fibers are present in that direction, since no carbon fibers are preseent in the direction at right angles to the longitudinal direction, the strength of the fishing rod in the direction at right angles to the longitudinal direction is not sufficient. Thus, in the production of a fishing-rod by the combined use of glass and carbon fibers as shown in FIG. 3, it is necessary that some of the long carbon fibers be orientated at an angle with respect to the other long carbon fibers or that another fiber fabric or fabrics be employed in combination with the long carbon fibers.

FIG. 4 shows another conventional method for producing a fishing-rod by the combined use of glass and carbon fiber fabrics. In the method of FIG. 4, a piece of glass fiber fabric 2 and a piece of carbon fiber fabric 4a having the same trapezoidal shape are connected together with the adjacent longitudinal edges thereof over lapping one another. As mentioned hereinabove, the glass and carbon fiber fabrics 2 and 4a are preliminarily impregnated with the same liquid thermosetting plastic as employed in the glass fiber fabric 2 and carbon fibers 4 of FIG. 3. Referring back to FIG. 4 again, the connected glass and carbon fiber fabrics 2 and 4a are wound about a tapered mandrel 1 similar to that described hereinabove in connection with the methods of FIGS. 1 through 3 with the narrower width end portions of the two fabrics directing to the reduced diameter end portion of the mandrel 1. In the method of FIG. 4, if the glass and carbon fiber fabrics 2 and 4a are connected together with the adjacent longitudinal edges thereof lapping one upon another by great lapping depth or width, a laminated spiral structure in which the glass and carbon fiber fabrics form alternate layers is obtained or alternatively, if the glass and carbon fiber fabrics 2 and 4a are lapped along their longitudinal edges in a small lapping depth or width, the obtained structure will have a substantially circular cross-section. The method of FIG. 4, is designed so that the glass fiber fabric 2 is surrounded by the carbon fiber fabric 4a in the laminated structure, but it is also possible that the carbon fiber fabric 4a to be surrounded by the glass fiber fabric 2 in the laminated structure.

The methods shown in FIGS. 3 and 4 have a common in that a fishing-rod is produced by combining glass and carbon fibers together in the same percentage or selected different percentages and in order to impart a high strength in the longitudinal direction of the fishing-rod especially, the warp yarns of both the glass fiber fabric and the long carbon fibers or the warp yarns of the carbon fibers extend parallel to each other in the longitudinal direction of the fishing-rod. In other words, the methods of FIGS. 3 and 4 are mere modifications of the method shown in FIGS. 1 and 2 because a portion of the glass fibers employed in the method of FIGS. 1 and 2 is replaced by the carbon fibers.

The method shown in FIG. 5 is somewhat different from the methods referred to hereinabove. According to the method of FIG. 5, long carbon fibers 4b are placed along the length of a tapered mandrel 1 similar to the mandrel described in connection with the preceding methods and then a single continuous length of glass fiber yarn 6 is wound about the long carbon fibers 4b in a spiral form. It should be understood that both the carbon fibers 4b and glass fiber yarn 6 are preliminarily impregnated with the same liquid thermosetting plastic. In this method, the fibers which impart a desired strength to the fishing-rod in the longitudinal direction thereof comprise only the carbon fibers 4b and only the fibers of the glass fiber yarn 6 are positioned to maintain the circular cross-section configuration of the complete fishing-rod. Although this method uses the carbon and glass fibers in combination, the two types of fibers are employed for different purposes, respectively and thus, the fishing-rod produced by the method of FIG. 5 may be referred to as a 100% carbon fishing rod. However, the fishing-rod produced by this method has insufficient strength in the longitudinal direction for its intended purpose because the shape maintaining capability of the single glass fiber yarn 6 is not sufficient.

In the method shown in FIG. 6, a bundle of long carbon fibers 4c is placed surrounding and extending the length of a tapered mandrel 1 similar to that described in connection with the preceding methods. Then, a piece of glass fiber fabric 7 in the form of a tape is wound in a spiral form about the carbon fibers 4c in one direction at a suitable angle to the axis of the mandrel 1 with no clearance left between the side edges of the adjacent turns of the tape and finally, a piece of similar glass fiber fabric 8 in the form of a tape is wound in a spiral form about the previously wound glass fiber fabric tape 7 in the opposite direction at a suitable angle to the longitudinal axis of the mandrel intersecting the tape 7 with no clearance left between the adjacent turns of the tape 8. In this method, since the carbon fibers 4c and the fibers of the tapes 7, 8 are merely applied in discrete layers and are not interwoven, the strength of the produced fishing-rod in the longitudinal direction is insufficient for its intended purpose. And the method of FIG. 6 requires a rather complicate forming procedure. Also in the method of FIG. 6, it should be understood that the carbon fibers 4c and the glass fiber fabric tapes 7, 8 are preliminarily impregnated with the same liquid thermosetting plastic as employed in the methods of FIGS. 1 through 5.

The thermosetting plastic employed in the methods referred to hereinabove may be one member selected from the group comprising phenol, epoxy, polyester and the like which are especially useful in the production of small diameter hollow elongated products such as fishing-rods which require substantial strength. These plastics are heat-set at a high temperature within the range of 140°–180° C. at which the thermosetting plastic is set. While the carbon fibers have a very small coefficient of thermal expansion, the glass fibers have a very great coefficient of thermal expansion. Therefore, when the glass and carbon fiber layers are placed one upon another and heated at a high temperature within the range of about 140°–180° C. for about 0.5–2 hours, the two layers are prefectly secured together by means of the set thermosetting plastic and thereafter they are allowed to cool in open air. Since the glass fibers have a great coefficient of thermal expansion, when cooled, the glass fibers shrink by a substantial amount. As the result, a substantial internal distortion occurs within the produced fishing-rod resulting in a substantial warp of the fishing-rod. Even when the fishing-rod is bent by a small degree with an external force, the so-called layer separation phenomenon occurs. The above-mentioned conventional methods have the disadvantage they are not applicable to fishing-rods of high quality.

SUMMARY OF THE INVENTION

Therefore, the purpose of the present invention is to provide a quality fishing-rod by eliminating the disadvantages inherent in the above-mentioned conventional methods which employ glass and carbon fibers in combination.

According to one embodiment of the present invention, the purpose is attained by providing a method comprising the steps of providing a piece of trapezoidal liquid thermo-plastic impregnated glass fiber fabric comprising warp and weft yarns of the same thickness and cut so as to orient the yarns at 45° with respect to the longitudinal center line of the fabric winding the fabric about a tapered mandrel with the narrower width end portion of the fabric directing to the reduced diameter end portion of the mandrel while interposing at least one bundle of long carbon fibers between adjacent turns of the fabric being wound with the carbon fibers extending in the longitudinal direction of the fabric, said carbon fibers being also preliminarily impregnated with said thermosetting plastic, heating the glass fiber fabric and carbon fibers together to set the thermosetting plastic to form a unitary structure fishing-rod and removing the mandrel from the fishing-rod.

BRIEF DESCRIPTION OF THE DRAWINGS

FIG. 7 is a schematic view of one preferable embodiment of the fishing-rod producing method of the present invention showing an initial step of the method in which a piece of glass fiber fabric is wound about a mandrel with at least one bundle of long carbon fibers interposed between adjacent turns of the fabric being wound;

FIG. 8 is a developed view of said glass fiber fabric as shown in FIG. 7;

FIG. 9 is a schematic view of another embodiment of the method of the present invention showing an initial step of the method in which two pieces of glass fiber fabrics are wound in the same direction about a mandrel in overlapping relation; and FIG. 10 is an explanative view showing how to cut glass fiber fabrics from a glass fiber fabric material.

DETAILED DESCRIPTION OF THE INVENTION

Figure 1:
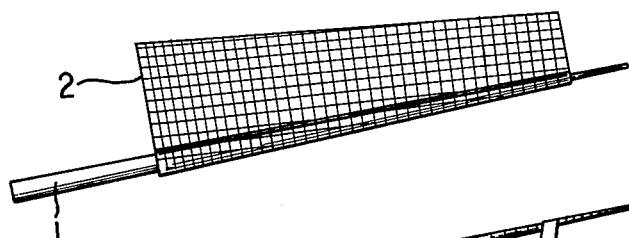
FIG. 1 is a schematic view of one coventional fishing-rod producing method showing an initial step of the method in which a glass fiber fabric is wound about a mandrel.
Figure 2:
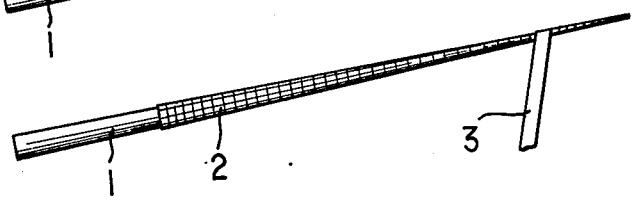
FIG. 2 is a schematic view of said one conventional fishing-rod producing method of FIG. 1 showing a further advanced step in which a cellophane tape is wound in a spiral form about the already wound glass fiber fabric.
Figure 3:
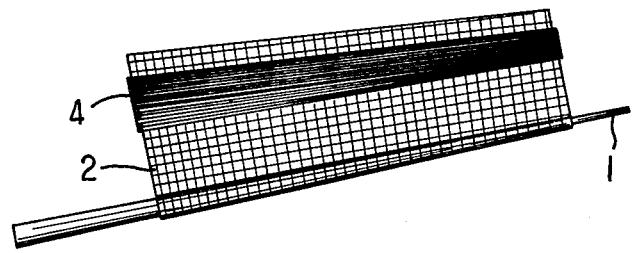
FIG. 3 is a schematic view of another conventional fishing-rod producing method showing an initial step of the method in which a glass fiber fabric is wound about a mandrel with bundles of long carbon fibers interposed between the successive turns of the glass fiber fabric being wound with the carbon fibers extending in the longitudinal direction of the mandrel.
Figure 4:
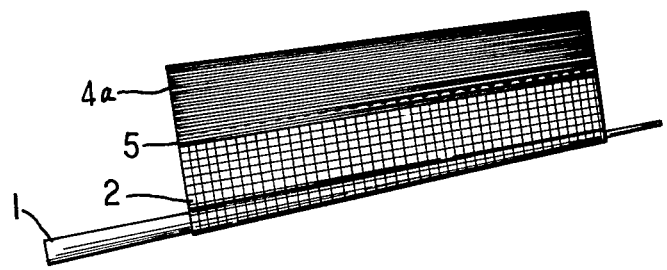
FIG. 4 is a schematic view of another conventional fishing-rod producing method showing an initial step of the method in which pieces of glass and carbon fiber fibrics connected along their longitudinal edges are wound in a spiral form about a mandrel.
Figure 5:
FIG. 5 is a schematic view of another conventional fishing-rod producing method showing an advanced step of the method in which a glass fiber yarn is wound about long carbon fibers applied along the length of a mandrel.
Figure 6:
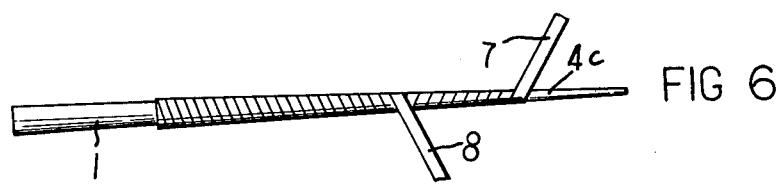
FIG. 6 is a schematic view of a further conventional fishing-rod producing method showing an advanced step of the method in which two glass fiber fabric tapes are wound in opposite intersecting angles about long carbon fibers applied along the length of a mandrel.

The present invention will be now described referring to FIGS. 7 through 10 of the accompanying drawings and more particularly to FIGS. 7 and 8 thereof in which one preferred embodiment of the method of the present invention is shown. The glass fiber fabric employed in the production of a fishing-rod by the method of the invention is shown by reference numeral 12. The glass fiber fabric 12 has a symmetrical trapezoidal shape and comprises warp and weft yarns of the same thickness as in the conventional methods referred to hereinabove, but is cut from a piece of glass fiber fabric material which is referred to "plain weave glass fiber fabric" having indefinite dimensions so as to orient the warp and weft yarns at 45° with respect to the longitudinal center line X—X as shown in FIG. 8, respectively. The trapezoidal glass fiber fabric 12 is impregnated with a liquid thermosetting plastic such as one member selected from the group referred to hereinabove. The plastic impregnated glass fiber fabric 12 is wound about a tapered mandrel 11 similar to the mandrel 1 described hereinabove in connection with the conventional methods with the narrower width end portion of the glass fiber fabric 12 directing to the reduced diameter end portion of the mandrel 11. While the glass fiber fabric 12 is being wound about the mandrel 11 in the manner mentioned hereinabove, a bundle of long carbon fibers 13 which have substantially the same length as the glass fiber fabric 12 and have been preliminarily impregnated with the same liquid plastic as employed in the glass fiber fabric 12 is interposed between adjacent turns of the glass fiber fabric 12 covering a distance in the transverse direction of the glass fiber fabric and extending in the longitudinal direction of the mandrel 11 or one bundle of such carbon fibers is interposed between each adjacent turn of the glass fiber fabric in offset relation to other bundles of the same carbon fabrics to be interposed between other successive adjacent turns of the glass fiber fabric with the carbon fibers extending in the longitudinal direction of the mandrel 11. In the latter instance, it should be understood that each bundle of carbon fibers covers a shorter distance in the transverse direction of the glass fiber fabric than in the former instance. Thereafter, a cellophane tape (not shown) similar to the cellophane 3 shown in FIG. 2 is wound about the glass fiber fabric 12 in a spiral form and the thus formed assembly is heated at a high temperature within the range about 140°-180° C. for about 0.5-2 hours to set the impregnated thermosetting plastic and allow the plastic to cool in open air to thereby form a desired fishing-rod. After the formation of the fishing-rod, the mandrel 11 and cellophane tape are removed from the fishing-rod and the outer surface of the set plastic is polished and a paint coating applied thereto.

FIGS. 9 and 10 show another embodiment of the method of the present invention in which two pieces of identical glass fiber fabrics 15, 15 which have a non-symmetric trapezoidal shape and each comprised of warp and weft yarns of different thicknesses. The non-symmetric trapezoidal glass fiber fabrics 15 are obtained by being cut from a piece of glass fiber fabric material 14 of indefinite dimensions in symmetric relation with respect to the line which separates the two non-symmetric trapezoidal glass fiber fabrics 15 from each other so as to orient the warp and weft yarns of the fabrics at 45° with respect to the longitudinal center line of each fabric 15. The non-symmetrical trapezoidal glass fiber fabrics 15, 15 are preliminarily impregnated with the same thermo-setting plastic as that impregnated in the trapezoidal glass fiber fabric 12 shown in FIGS. 7 and 8. The two non-symmetrical trapezoidal glass fiber fabrics 15, 15 are wound about a tapered mandrel 11 in the same direction in overlapping relation with the narrower width end portions of the fabrics directed to the reduced diameter end portion of the mandrel 11. Also in the embodiment of FIGS. 9 and 10, although not shown, a bundle of long carbon fibers (not shown) similar to that shown in FIG. 7 is interposed between adjacent turns of the two glass fiber fabrics 15, 15 while the fabrics are being wound with the long carbon fibers extending in the longitudinal direction of the mandrel 11. Also in the embodiment of FIGS. 9 and 10, it should be understood that a plurality of bundles of long carbon fibers can be employed with each bundle interposed between each adjacent turn of the pieces of glass fibers 15, 15 in offset relation to the bundles of similar long carbon fibers interposed between other successive adjacent turns of the glass fiber fabrics in the same manner as mentioned in connection with FIGS. 7 and 8. After the non-symmetrical glass fiber fabrics 15, 15 have been wound in the manner mentioned hereinabove about the mandrel 11 with the long carbon fibers interposed therebetween, the assembly is heated until the thermo-setting plastic is set and subjected to the polishing and coating treatments after the removal of the mandrel 11 from the assembly as described in connection with the embodiment of FIGS. 7 and 8.

In the foregoing, it has been described that the warp and weft yarns in the glass fiber fabric are orientated at 45° with respect to the longitudinal center line of the fabric, the warp and weft yarns may be orientated at other angles with respect to the longitudinal center line of the fabric provided that the warp and weft yarns intersect each other.

As mentioned hereinabove, the fishing-rod produced by the method of the present invention has a high strength provided by the long carbon fibers in the longitudinal direction and a circular cross-section holding capability provided by the 45° intersecting glass fibers in the diametrical direction.

The fishing-rod in the form of a pipe is not substantially subjected to distortion due to thermal contraction in the longitudinal and transverse directions and exibits satisfactory shape holding capability in the longitudinal and transverse directions and in consequence, the produced fishing-rod will not bend inadvertently. The strength of the fishing-rod produced by the method of the invention is maintained in a balanced state throughout the length by the presence of both the glass and carbon fibers therein and the fishing-rod has a quite reasonal physical structure.

Furthermore, the ratio between the glass fibers and carbon fibers employed may be varied within a relatively wide range without departing from the scope of the invention. By varying the glass to carbon fiber ratio, the flexibility of the fishing-rod can be easily varied as desired depending upon the applications of the fishing-rod. In the method of the invention, the necessary amount of expensive carbon fibers can be substantially reduced and the method of the invention is quite advantageous in the production of fishing-rods.

In carrying out the method of the present invention, the carbon fibers can be also employed in the form of a woven fabric and the carbon fibers may be disposed on the outer side of the glass fibers.

In the foregoing, description has been made of the production of fishing-rods, the method of the invention can be also equally applicable to the production of other laminated articles such as skis, structural elements and the like with a minor modification of the method within the scope of the invention.

While only preferred embodiments of the invention have been shown and described in detail it will be understood that the same are for illustration purpose only and not to be taken as a definition of the invention, reference being had for the purpose to the appended claims.

What is claimed is:

1. A method for producing a fishing-rod comprising the steps of:
   providing at least one piece of longitudinally symmetrical trapezoidal glass fiber fabric impregnated with liquid thermosetting plastic and having warp and weft yarns intersecting each other at a 45° angle with respect to the longitudinal center line of said fabric;
   winding said trapezoidal glass fiber fabric about a tapered mandrel with the narrower end portion of said fabric directed toward the reduced diameter end portion of said mandrel;
   at the same time as the winding of said fabric, interposing at least one bundle of long carbon fibers having substantially the same length as said glass fiber fabric and which is impregnated with the same thermosetting plastic that impregnates said glass fiber fabric between adjacent turns of said glass fiber fabric and covers a distance in the transverse direction of said fabric and extends in the longitudinal direction of said mandrel;
   heating the thus-obtained assembly to set said thermosetting plastic to thereby integrally unite the glass fiber fabric and carbon fibers together into a unitary structure; and
   removing said mandrel from said unitary structure.

2. A method as claimed in claim 1, wherein said warp and weft yarns have the same thickness.

3. A method as claimed in claim 1, wherein a plurality of bundles of long carbon fibers are employed, each bundle being interposed between adjacent turns of said glass fiber fabric in offset relation to other bundles interposed between successive turns of said glass fiber fabric.

4. A method for producing a fishing-rod comprising the steps of:
   providing two pieces of identical non-symmetrical trapezoidal glass fiber fabrics impregnated with liquid thermosetting plastic, each having warp and weft yarns intersecting each other at an angle with respect to the longitudinal center line of said fabric;
   inverting one of said non-symmetrical trapezoidal glass fiber fabrics on top of the other with the corresponding two narrower ends on top of each other and the corresponding two wider ends of top of each other;
   winding said overlaid trapezoidal glass fabric fibers about a tapered mandrel in the same direction with the narrower end portions of the fabrics directed toward the reduced end portion of said mandrel;
   at the same time as said winding, interposing at least one bundle of long carbon fibers having substantially the same length as said glass fiber fabric which is impregnated with the same thermosetting plastic that impregnates said glass fiber fabric between adjacent turns of said glass fiber fabric, covers a distance in the transverse direction of said fabric, and extends in the longitudinal direction of said mandrel;
   heating the thus-obtained assembly to set said thermosetting plastic to thereby integrally unite said glass fiber fabrics and carbon fibers together into a unitary structure; and
   removing said mandrel from said unitary structure.

5. A method as claimed in claim 4, wherein said warp and weft yarns of each of said trapezoidal glass fiber fabrics intersect each other at a 45° C. angle with respect to said longitudinal center line of fabric.

6. A method as claimed in claim 4, wherein said warp and weft yarns of each of said non-symmetrical glass fiber fabrics have different thicknesses.

7. A method as claimed in claim 4, wherein a plurality of bundles of long carbon fibers are employed, each bundle being interposed between adjacent turns of said glass fiber fabrics in offset relation to other bundles interposed between successive turns of said glass fiber fabrics.

* * * * *